Oct. 9, 1934.   M. WITTWER   1,976,677
PRODUCTION OF ALKYLENE DERIVATIVES FROM ALKYLENE OXIDES
Filed Aug. 9, 1930
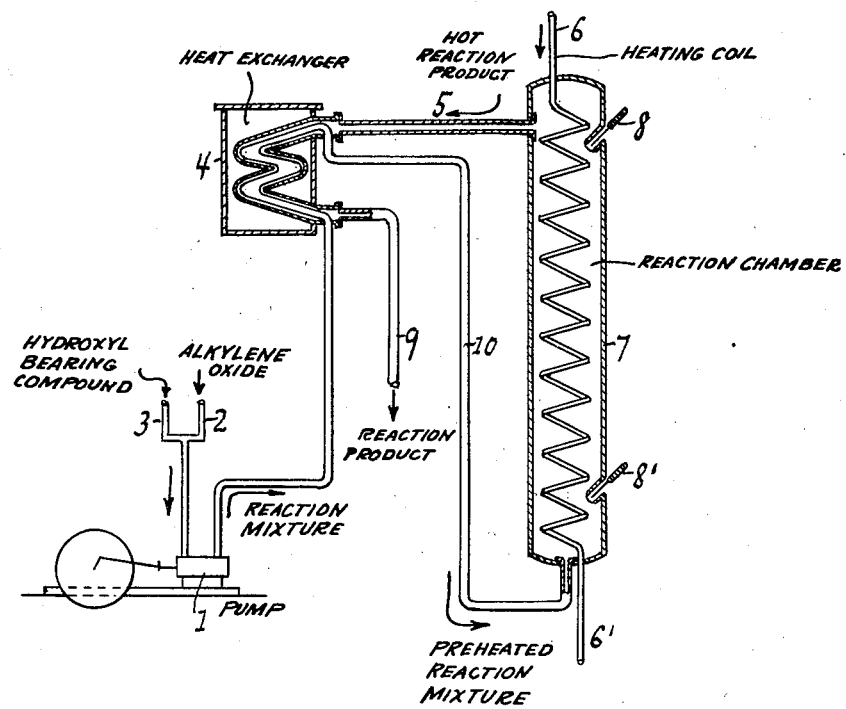
Max Wittwer
INVENTOR
BY ATTORNEYS Hauff Barland Patented Oct. 9, 1934

1,976,677

UNITED STATES PATENT OFFICE 1,976,677

PRODUCTION OF ALKYLENE DERIVATIVES FROM ALKYLENE OXIDES

Max Wittwer, Ludwigshafen-on-the-Rhine, Germany, assignor to I. G. Farbenindustrie Aktiengesellschaft, Frankfort-on-the-Main, Germany Application August 9, 1930, Serial No. 474,290
In Germany August 20, 1929

10 Claims. (Cl. 260—106)

The present invention relates to the production of alkylene derivatives from alkylene oxides. It is already known that hydroxy alkyl compounds are obtained by the action of alkylene oxides such as ethylene oxide or its homologues for example propylene oxide or epichlorhydrin, on organic compounds having hydroxyl or carboxyl groups or on water. In order to effect this reaction, either catalysts are added, or the reaction mixtures are heated at a pressure above atmospheric pressure in a closed vessel. In both cases undesirable by-products are formed in a greater or less degree by the introduction of further molecules of alkylene oxide on to the hydroxy alkyl compounds already formed. In order to suppress the formation of these by-products, the reaction must be carried out with a large excess of diluent. A further objection is that when working at a pressure above atmospheric pressure large amounts of alkylene oxide must be heated at once and this renders it necessary by reason of the high vapour tension of the alkylene oxide employed either to heat very slowly or to employ vessels capable of withstanding very high pressures.

I have now found that the objections already described are obviated and that better yields are obtained and a substantially more economical production of the hydroxy alkyl compounds is effected by leading the alkylene oxide employed together with a hydroxyl bearing compound such as an alcohol, including phenols, or a carboxylic acid or water, which components are preferably employed in excess of the quantity theoretically required, continuously through a reaction tower or like vessel, where the mixture of the initial materials is immediately heated to a high temperature, generally to above 130° C., the resulting mixture then being freed from the unchanged portion of the component employed in excess preferably continuously. Since by this method only small amounts of alkylene oxide are brought to reaction at any given time, the pressure arising therefrom is comparatively small. The unchanged portion of the component employed in excess may, after being separated from the hydroxy alkyl compound formed during the reaction, be used again for conversion with further amounts of the alkylene oxide employed, so that the process may be performed in a cycle. The process is carried out at a pressure above atmospheric pressure, generally at a pressure above about 5 atmospheres up to 20 or 30 atmospheres. Still higher pressures may be applied but these require special, rather expensive apparatus.

An apparatus suitable for carrying out the process according to the present invention is diagrammatically shown in the accompanying drawing, in which 1 denotes a pump with feeding pipes 2 and 3, 4 is a heat exchanger, 7 is a pressure-tight cylindrical reaction vessel, containing a heating coil 6, 6' and provided with devices 8, 8' for measuring the internal temperature, 5 is a pipe connecting said reaction vessel 7 with the heating coil of the heat exchanger 4, 9 is a pipe for withdrawing liquid from the heat exchanger after the liquid has given off its heat and 10 is a pipe for feeding liquid, heated in said heat exchanger 4, to the bottom of said reaction vessel 7. On working with the apparatus described the reaction components are fed through pipes 2 and 3, into the pump 1 and therefrom through the heat exchanger 4 and pipe 10 to the bottom of the reaction vessel 7. The reaction vessel 7 is heated by means of the coil 6, 6' to the desired temperature and the hot reaction mixture is pressed through pipe 5 and the heat exchanger 4 into the outlet pipe 9, which latter may be led directly to a still for separating the reaction products and remainders of initial material.

The employment of high temperatures rendered possible by the process according to the present invention effects a rapid reaction, so that the throughput obtainable with a small apparatus is increased in an extraordinary degree. Moreover, since the large excess of diluent necessary in the processes already known may be substantially reduced, a considerable saving in distillation costs is effected. A further considerable increase in the economy of the process according to the present invention is effected by the utilization of the considerable heat of reaction. The reaction heat can be advantageously employed for preheating fresh initial material and/or for a separation of the products from unchanged initial material by distillation.

The following examples will further illustrate the nature of this invention but the invention is not restricted to these examples.

*Example 1*

A mixture of 1 molecular proportion of ethylene oxide and 2 molecular proportions of ethyl alcohol is continuously pumped into a tower in which the liquid is immediately heated to 180° C., a pressure of about 30 atmospheres being attained. The resulting solution which contains ethyl alcohol and ethylene glycol mono-ethyl ether is continuously led directly into an open still and the solution is there freed from the excess of ethyl alcohol. The ethylene glycol monoethyl ether is obtained in a theoretical yield. The ethyl alcohol recovered is preferably returned into the process.

Example 2

A solution of 1 molecular proportion of 1.2-propylene oxide in 2 molecular proportions of methanol is treated as described in Example 1. Propylene glycol monomethyl ether is obtained in the calculated amount.

Example 3

1 molecular proportion of ethylene oxide is dissolved in 3 molecular proportions of water and the solution is pumped into a tower which is heated to 220° C. whereby a pressure of about 10 atmospheres is attained. The effluent ethylene glycol solution is freed from water and the remaining ethylene glycol is recovered in a pure state and in a yield of 95 per cent by distillation in vacuo.

Example 4

A mixture of 1 molecular proportion of ethylene oxide and 2 molecular proportions of glacial acetic acid is pumped through an enamelled tower at 180° centigrade so that a pressure of about 5 atmospheres is attained. After distilling off the remainder of the glacial acetic acid the resulting ethylene glycol monoacetate is obtained in a pure state in a yield of 90 per cent of the theoretical yield with reference to the quantity of ethylene oxide employed.

Example 5

A mixture of 1 molecular proportion of ethylene oxide and 2 molecular proportions of phenol is continuously pumped through a reaction tower in which the mixture is quickly heated to 200° C., whereby a pressure of 10 atmospheres is attained. After distilling off remainders of phenol, ethylene glycol monophenyl ether having a boiling point of 240° C. is obtained in a yield of 85 per cent calculated on the quantity of ethylene oxide employed.

Example 6

A continuous current of a mixture of one molecular proportion of epichlorhydrin and 3 molecular proportions of methanol is pressed through a tower heated to 180° C., whereby a pressure of 20 atmospheres is attained. After distilling off the remainders of methanol the mono-methyl ether of α-chloro propylene glycol having a boiling point of 170° C. is obtained in a quantitative yield.

What I claim is:—

1. In the production of alkylene derivatives from alkylene oxides by acting with the latter on hydroxyl bearing compounds, the step which comprises passing continuously an alkylene oxide together with a hydroxyl bearing compound which is liquid at the temperatures of working and which is selected from the class consisting of water and organic hydroxyl bearing compounds through a reaction vessel heated to above 130° C. at superatmospheric pressure.

2. In the production of alkylene derivatives from alkylene oxides by acting with the latter on hydroxyl bearing compounds, the step which comprises passing continuously an alkylene oxide together with a hydroxyl bearing compound which is liquid at the temperatures of working and which is selected from the class consisting of water and organic hydroxyl bearing compounds in a quantity exceeding that theoretically required through a reaction vessel heated to above 130° C. at superatmospheric pressure, the reaction mixture being then freed from the remainders of hydroxyl bearing compound.

3. In the production of alkylene derivatives from alkylene oxides by acting with the latter on hydroxyl bearing compounds, the step which comprises passing continuously an alkylene oxide together with a hydroxyl bearing compound which is liquid at the temperatures of working and which is selected from the class consisting of water and organic hydroxyl bearing compounds through a reaction vessel heated to above 130° C. at superatmospheric pressure.

4. In the production of alkylene derivatives from alkylene oxides by acting with the latter on water, the step which comprises passing continuously an alkylene oxide together with water in a quantity exceeding that theoretically required through a reaction vessel heated to above 130° C. at superatmospheric pressure, the reaction mixture being then freed from the remainders of water.

5. In the production of alkylene derivatives from alkylene oxides by acting with the latter on a carboxylic acid, the step which comprises passing continuously an alkylene oxide together with a carboxylic acid in the liquid state and in a quantity exceeding that theoretically required through a heated reaction vessel at superatmospheric pressure, the reaction mixture being then freed from the remainders of carboxylic acid.

6. In the production of alkylene derivatives from alkylene oxides by acting with the latter on an alcohol, the step which comprises passing continuously an alkylene oxide together with an alcohol in the liquid state and in a quantity exceeding that theoretically required through a heated reaction vessel at superatmospheric pressure, the reaction mixture being then freed from the remainders of alcohol.

7. In the production of alkylene derivatives from alkylene oxides by acting with the latter on hydroxyl-bearing compounds, the step which comprises continuously passing an alkylene oxide together with a hydroxyl-bearing compound which is liquid at the temperature of working and which is selected from the class consisting of water and organic hydroxyl-bearing compounds, which compound is employed in a quantity exceeding that theoretically required, through a reaction vessel maintained at a temperature above 130° C. and at a pressure ranging from 5 to 30 atmospheres.

8. In the production of alkylene derivatives from alkylene oxides by acting with the latter on hydroxyl-bearing compounds, the step which comprises continuously passing an alkylene oxide together with a hydroxyl-bearing compound which is liquid at the temperature of working and which is selected from the class consisting of water and organic hydroxyl-bearing compounds, which compound is employed in a quantity exceeding that theoretically required, through a reaction vessel maintained at a temperature between 130° and 220° C. and at a pressure ranging from 5 to 30 atmospheres.

9. In the production of alkylene derivatives from alkylene oxides by acting with the latter on hydroxyl-bearing compounds, the step which comprises continuously passing an alkylene oxide together with water in a quantity exceeding that theoretically required through a reaction vessel maintained at a temperature between 130° and 220° C. and at a pressure ranging from 5 to 30 atmospheres.

10. In the production of alkylene derivatives from alkylene oxides by acting with the latter on hydroxyl-bearing compounds, the step which comprises continuously passing an alkylene oxide together with water in a quantity exceeding that theoretically required through an elongated vertical reaction space maintained at a temperature between 130° and 220° C. and at a pressure ranging from 5 to 30 atmospheres.

MAX WITTWER.